United States Patent [19]

Gessler

[11] 4,376,052

[45] Mar. 8, 1983

[54] FLUID MANIFOLD ASSEMBLY FOR SOLVENT EXTRACTOR

[75] Inventor: Donald A. Gessler, Verona, Pa.

[73] Assignee: Dravo Corporation, Pittsburgh, Pa.

[21] Appl. No.: 236,741

[22] Filed: Feb. 23, 1981

[51] Int. Cl.³ .............................................. B01D 11/02
[52] U.S. Cl. .................... 210/511; 210/456; 422/268
[58] Field of Search ................ 422/268; 210/634, 511, 210/456; 260/412.4, 412.8

[56] References Cited

U.S. PATENT DOCUMENTS 2,840,459  6/1958  Karnofsky ...................... 422/268 X
3,626,486 12/1971  Bugbee et al. ................. 210/456 X
4,120,790 10/1978  Tinker et al. .................. 210/456 X Primary Examiner—Frank A. Spear, Jr.
Attorney, Agent, or Firm—Louis E. Marn; E. M. Olstein

[57] ABSTRACT

There is disclosed a manifold assembly for a rotary solvent extractor formed of an elongated fluid distribution trough or conduit divided into a plurality of fluid distribution subsections by intermediate gate members wherein each fluid distribution subsection is in fluid communication with a fluid supply conduit. A deflector plate is disposed therebelow beneath a manifold assembly to permit for the adjustment of the angle of fluid discharge.

6 Claims, 4 Drawing Figures

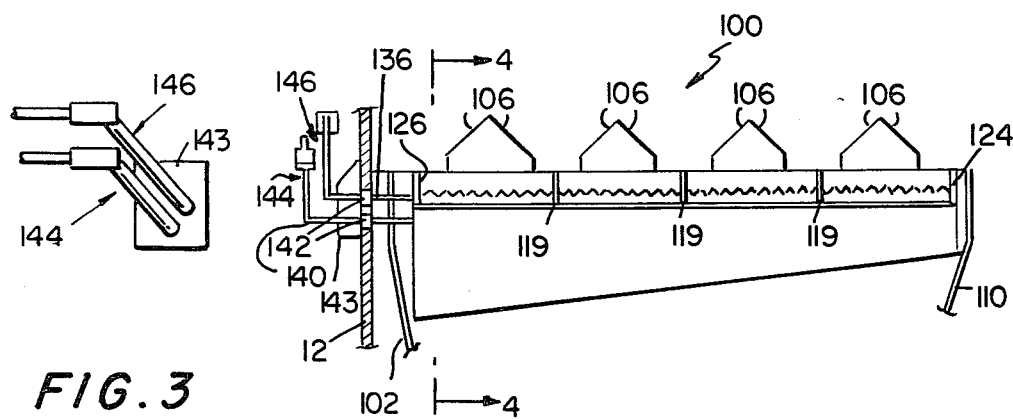
FIG. 3
FIG. 2
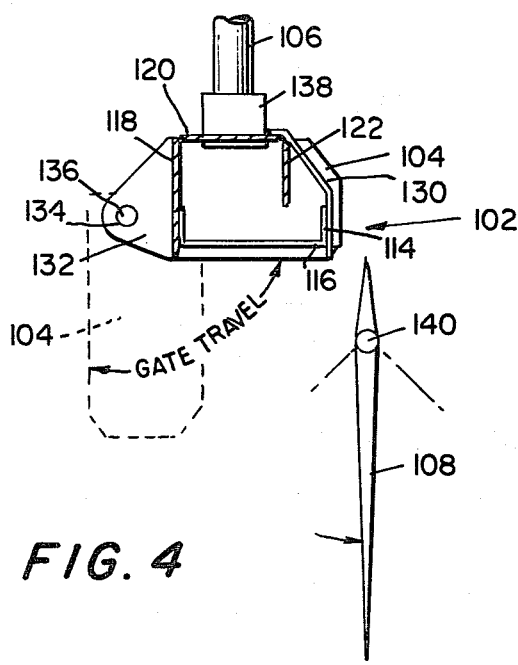
FIG. 4

FLUID MANIFOLD ASSEMBLY FOR SOLVENT EXTRACTOR

FIELD OF THE INVENTION

This invention relates to the solvent extraction of particulate material, and more particularly to an improved fluid manifold assembly for an extractor assembly for the solvent extraction of soluble materials from particulate solids.

BACKGROUND OF THE INVENTION

In U.S. Pat. No. 2,840,459, assigned to the same assignee as the present invention, there is disclosed a process and apparatus for the continuous extraction of oils and/or soluble materials from particulate materials and comprised of a large vessel forming a vapor-tight enclosure in which there is disposed a rotor including a plurality of cells formed by radially disposed inner walls extending toward and mounted to peripherally-disposed end walls. A plurality of fluid manifold assemblies are radially disposed above the cells in a preselect manner to permit the introduction of miscella and solvent stream into the cells, generally to effect a countercurrent extraction utilizing percolation techniques. The bottom of each cell is provided with a hinged-door assembly including associated equipment for opening and closing each cell. Drainage compartments generally underlie the cells for collecting miscella, i.e. a solution of oil and solvent for recycle within the apparatus, and eventual withdrawal as described in such aforementioned U.S. Letters Patent.

Such manifold assemblies are generally long pipe sections of large diameters with slotted openings and fixed deflectors and protrude through the vapor-tight enclosure. Each such manifold assembly is provided with a flange member assembled to the vapor-tight enclosure in a manner to permit adjustment. The flooding fluid (including fines in the case of miscellas) is introduced into the pipe sections and is discharged via the slots into the particulate material in the cells positioned therebelow. The angle of fluid discharge of each manifold is adjusted by unbolting the flange and rotating the pipe section to the desired position after process shut-down of the extractor assembly which remains shut-down until all adjustments are made to the manifold assemblies. During shut-down, it is convenient to remove fines from within the pipe sections resulting from the continuous circulation of miscella streams including fines which deleterious effect processing operation by build-up and bridging of the fines. Fines build-up and/or bridging require shut-down and fine removal notwithstanding any necessity of manifold assembly adjustment.

OBJECT OF THE INVENTION

An object of the present invention is to provide a novel manifold assembly for an extractor assembly permitting of on-stream fines removal.

Another object of the present invention is to provide a manifold assembly for an extractor assembly permitting of on-stream adjustment of the angle of fluid discharge.

A further object of the present invention is to provide a manifold assembly for an extractor assembly of fixed mounting within the extractor assembly.

Still another object of the present invention is to provide a manifold assembly for an extractor assembly permitting of visual observation of the angle of fluid discharge.

Yet another object of the present invention is to provide a manifold assembly for an extractor assembly permitting of continued on-stream operation of the extractor.

A still further object of the present invention is to provide a manifold assembly for an extractor assembly permitting of uniform fluid flow over the bed of particulate material in a cell.

SUMMARY OF THE INVENTION

These and other objects of the present invention are achieved by a plurality of radially-disposed manifold assemblies for a rotary solvent extractor wherein each manifold assembly is formed of an elongated fluid distribution trough or conduit divided into a plurality of fluid distribution subsections by intermediate gate members wherein each fluid distribution subsection is in fluid communication with a fluid supply conduit. A deflector plate is disposed beneath a manifold assembly 20 to permit for the adjustment of the angle of fluid discharge to cells of the rotary extractor.

BRIEF DESCRIPTION OF THE DRAWING

A better understanding of the present invention as well as other objects and advantages thereof will become apparent upon consideration of the detailed disclosure thereof, especially when taken with the accompanying drawings wherein;

FIG. 2 is a front view of the manifold assembly of the present invention;

FIG. 3 is a side view illustrating the exterior of the extractor vessel proximate the manifold assembly; and FIG. 4 is an enlarged cross-sectional view taken along the lines 4—4 of FIG. 2.

DETAILED DESCRIPTION OF THE INVENTION

Figure 1:
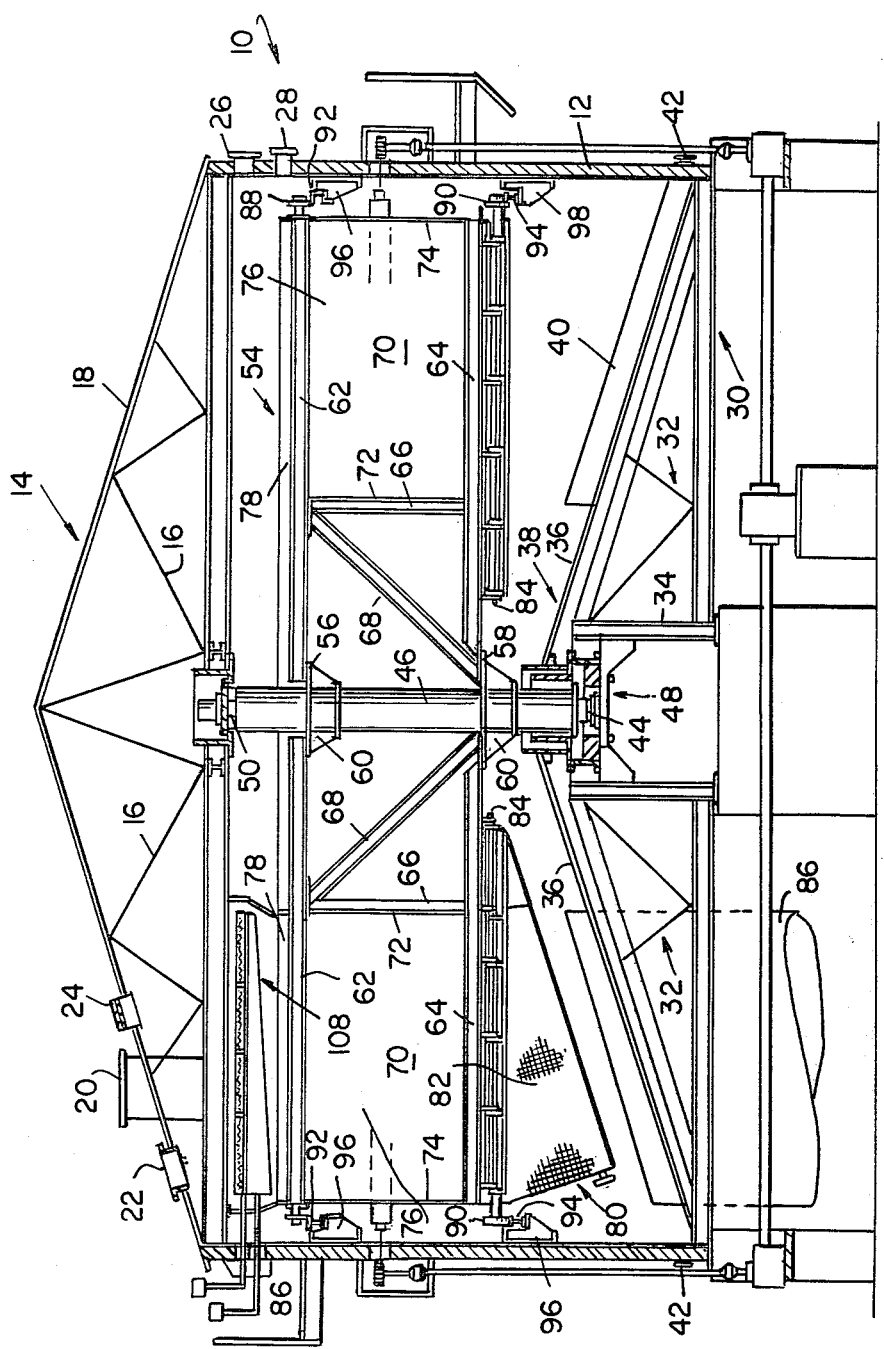
FIG. 1 is a cross-sectional elevational view of a rotary extractor illustrating the basic element thereof.

Referring now to FIG. 1, there is provided an extractor assembly, generally indicated as 10, comprised of a cylindrical casing or vessel 12 positioned on a suitable foundation and having a trussed roof mounted thereon, generally indicated as 14, comprised of a plurality of radially extending roof truss members 16, on which are mounted plate member 18. The trussed roof 14 is provided with a feed chute 20, a manhold access way 22 and visual access assembly 24. The vessel 12 is similarly provided with manhold access way 26 and looking glass assemblies 28 all positioned for access and visual inspection of the operation of the extractor 10.

The bottom of the extractor 10, generally indicated as 30, is comprised of a plurality of radially extending cone truss members, generally indicated as 32, mounted to a rotor bearing support 34 positioned on a suitable foundation. On the cone truss members 32, there are mounted cone plate members 36 forming a generally conically-shaped sloping bottom wall, generally indicated as 38. Mounted to the cone plate members 36 are vertically standing plates 40 (one shown) radially positioned there around forming a plurality of solvent collection zones having outlets 42, such as disclosed in the hereinabove mentioned U.S. Letters Patent. To prevent solvent losses, the extractor 10 including the vessel 12, roof 14 and bottom 30 is generally sealed to enable the extractor 10 to be operated below or above atmospheric pressure, generally below atmospheric to minimize solvent losses to the atmosphere.

A lower guide shaft 44 is vertically mounted to a rotor shaft 46 and is journalled for rotation in a combination of a thrust bearing and radial bearing, generally indicated as 48, positioned within the rotor bearing support 34. An upper guide shaft 50 is vertically mounted to the rotor shaft 46 for alignment in the radially extending roof truss members 16. Suitable lubrication and conventional vapor seals (not shown) are provided for guide shaft 44 and for the envelope of the extractor assembly 10.

The rotor shaft 46 supportably forms a part of a rotor in the form of a spool frame, generally indicated as 54. Upper and lower ring flanges 56 and 58, respectively are welded to rotor shaft 46 above brackets 60 circumferentially and radially spaced around shaft 46. The spool frame 54 is comprised of rigidly connected and radially extending cell support beams 62 and hinge support beams 64 fastened to ring flanges 56 and 58, respectively. Vertically-disposed struts 66 are positioned intermediate the cell support beams 62 and hinge support beam 64. Radially extending struts 68 are mounted at one end to the ring flange 58 and at the other end to the cell support beams 62 proximate to the juncture of the struts 66 to the cell support beams 62. The beams and struts are either welded or bolted together in rigid structure to form the spool frame 54 which provides support for cells 70 of the extractor assembly 10 adapted to contain solid material to be contacted by an extraction solvent, as is known to one skilled in the art.

Each cell 70 is open at the top and substantially sector-like in plan and is comprised of vertically disposed inner and outer walls 72 and 74 and radially and vertically disposed paired side walls 76. The paired side walls 76 are substantially vertical and incline inwardly towards the bottom (not shown) of the respective cells to minimize the tendency of solids to cling thereto. A gabled cap 78 is fixedly positioned on the top of each of the upper edges of the paired side walls 76 to assist in the abrupt transfer of liquid from a preceding cell to an immediately succeeding cell and also to prevent material from falling between adjoining walls.

The bottom of each cell 70 is trapezoidally-shaped and is enclosed by a hingedly attached door assembly, generally indicated as 80, including a mesh screen 82 of a preselect size for the material undergoing treatment. A hinge pin 84 is provided on each door assembly positioned about an edge adjacent the bottom of each cell to enable the door assembly to swing about the lower leading edge of each cell as the door assembly reaches a solids discharge chute 86. Journaled on the respective ends of the door assemblies 80 to the cell support beams 62 and hinge support beam 64 are a rotor wheel 88 and a cell door wheel 90, respectively, supportably engaged by rotor wheel track 92 and cell wheel track 94. The rotor wheel track 92 is peripherally mounted by rotor wheel track support brackets 96 to the inner wall of the vessel 12 with the cell wheel track 94 being mounted to the inner wall of the vessel 12 by cell wheel track support brackets 98. The rotor wheel track 92 is supportably engaged about the full periphery of the vessel 12 whereas the cell wheel track 92 is supportably engaged for that portion of the path of rotation of the cells 70 during which the door assemblies 80 are kept substantially in a closed position.

Radially positioned above the spool frame 54, are a plurality of radially disposed fluid manifold assemblies (one shown) generally indicated as 100, and positioned with respect to the inlet and outlet solids chute to provide the hereinabove mentioned countercurrent contacting relationship between miscella and solid materials being treated, as more fully hereinafter described. Each manifold assembly 100, referring now to FIGS. 2 and 3 and is comprised of an elongated, horizontally-disposed conduit member, generally indicated as 102, a plurality of vertically-disposed gate members 104, a plurality of fluid conduit 106, a flow deflector plate 108 and inner and outer fluid guide members 110 and 112. Each manifold assembly 100 is permanently mounted within the extractor 10.

The conduit member 102 is comprised of a vertically disposed overflow wall 114 including a serrated upper edge, a bottom wall 116, a back wall 118, a top wall 120 and a vertically-disposed wall member 122 extending partially downwardly towards the bottom wall 116, referring to FIG. 4 forming with interior side wall 124 and outer side wall 126 fluid chamber 128 from which the fluid is permitted to flow under the vertically-disposed wall member 122 and over the overflow wall 114. The overflow wall 114, the bottom wall 116 and back wall 118 are provided with slots 119 to receive the gate member 104. A plurality of support members 130 are mounted, such as by welding, to the overflow wall 114 and top wall 120 to provide rigidity to the structure. To the outer surface of the back wall 118, there is mounted a plurality of flange members 132 including shaft receiving orifice 134 for supporting a shaft 136 on which is mounted the gate members 114. The conduits 106 are mounted, such as by flange member 136, to the top wall 120 of the conduit member 102. Below and forward of the conduit member 102, there is positioned the deflector plate 108 mounted to a shaft 140.

The shaft 136 and shaft 140 on which are mounted gate members 104 and deflector plate 108, respectively, extend through suitably packing glands 142 positioned in the wall 12 of the extractor 10 within a housing 143, and are mounted to adjustment, assemblies, generally indicated as 144 and 146, respectively. Accordingly, relative positioning of the gate members 104 with respect to the conduit member 102 may be effect exteriorly of the vessel 12 as well as the angular positioning of the deflector plate 108 to adjust angular direction of flow.

The spool frame 54 of the extractor 10 is caused to be rotated by a chain 150 of infinite length coursed about a continuous chain receiving assembly 152 mounted about the outer walls 74 of the spool frame 54 and driving pinion gears 154 driven by motor and gear reducing assemblies 156.

As hereinabove mentioned the plurality of radially extending divider wall or plates 40 mounted to the bottom plate members 36 of the extractor 10 form a series of compartments inclusive beneath the cells 70 (except for the solids outlet chute), which compartments provide zones for the collection of solvent solutions of varying extract strengths providing for countercurrent extraction techniques. Above one compartment defining a primary miscella collection zone, generally there is provided an inverted V-shaped screen (not shown) which functions to separate fines from the primary flow of miscella passing therethrough. The fines together with minor quantities of miscella are caused to flow off such a screen to adjacent miscella collection compartments from which the fines may be washed, such as by adjustable nozzles (not shown). Miscella is withdrawn from the primary miscella collection compartment and passed to miscella storage tank (not shown) for further processing.

In operation, solid organic particulate material, such as soybean flakes, are continuously introduced into the extractor assembly 10 through the chute 20 mounted to and extending through the roof 14 to discharge the particulate material over the approximate center of each cell 70 passing therebeneath. The conduit 20 may be liquid tight so that a liquid may be introduced with the particulate material to be treated thereby effecting soaking of the material prior to treatment in the extractor assembly 10. The solids are successively contacted with continuous streams of miscella of diminished strength through the succession of the manifolds assemblies 100 to effect generally a countercurrent extraction process. As the leading edge of a cell 70 approaches the discharge chute 86, the cell wheel 90 of the cell assembly 80 rides down the terminal portion of the cell wheel track 94 to eventually cause the door to open thereby permitting the particulate material to drop into the discharge chute 86. It will be understood that the door stops and like assemblies are included to facilitate the opening and closing of the door assemblies with controlled impact to the extractor assembly 10.

To permit for the flushing of fines build-up in any or all of the manifold assemblies 100 during operation of extractor 10, the shaft 136 including gate member 104 is caused to be rotated in a clockwise direction adjustment assembly 144 to a point indicated by the dotted lines in FIG. 4 and maintained in such position for a time sufficient to effect fine removal. Thereafter, the shaft 136 is caused to be rotated adjustment assembly 144 in a counterclockwise position until reaching the setting for normal operation whereupon the shaft is caused to be fixed against inadvertent rotation. Similarly, the shaft 140 including deflector plate 108 is caused to be rotated by adjustment assembly 146 to correct or adjust for angular direction of flow and is similarly provided with means for fixedly positioning the adjustment assembly 146 to prevent inadvertent rotation of the deflector plate 108. Thus, use of the deflector plates 108 of the present invention obviate the necessity to adjust fluid discharge of the manifold by rotation thereof as herein before required thereby eliminating process shut-down of the extractor assembly. The vessel 12 is provided with means to permit instantaneous visual observation of the positioning of the gate member 104 and the deflector plate 108 for each manifold assembly 100.

While the hereinabove mentioned U.S. Letter Patent is described in the context of hexane extraction of soy beans, requiring a sealed rotary extractor, the present invention is applicable to the use of a solvent, such as water, for extraction of sugar from sugarcane wherein the rotary extractor need not be sealed.

While the invention has been described in connection with an exemplary embodiment thereof, it will be understood that many modifications will be apparent to those of ordinary skill in the art; and that this application is intended to cover any adaptions of variations thereof. Therefore, it is manifestly intended that this invention be only limited by the claims and the equivalents thereof.

What is claimed:

1. In a solvent extractor including a vessel having a plurality of cells formed by a plurality of radially extending walls arranged in circumferential fashion on a generally horizontal plane around a vertical extending rotor, a feed conduit for introducing solids to be treated into said cells, a solids-retaining bottom closure for each of said cells, a track to maintain said bottom closures in substantially closed position during a predetermined section of a rotational path of each of said cells, fluid manifold assemblies for successively introducing a solvent into said cells from above said predetermined section of said rotational path, liquid collection zones disposed beneath said cells and including a plurality of compartments for receiving liquid, an improved fluid manifold assembly, which comprises:

an elongated substantially horizontally-disposed conduit member having an overflow wall member, a plurality of vertically-disposed gate member with said conduit member thereby dividing said conduit member into plurality of sub-zones;

conduit means for introducing a fluid into said sub-zones of said conduit member; and means for moving said gate members from within said conduit member.

2. The apparatus as defined in claim 1 wherein said means for moving said gate members includes a shaft on which said gate members are mounted for substantially vertical rotation.

3. The apparatus as defined in claims 1 or 2 wherein said conduit member is formed of an overflow wall, a bottom wall, a back wall, a top wall and an intermediate wall position extending downwardly from said top wall to a point above said bottom wall thereby defining a fluid passageway.

4. The apparatus as defined in claim 3 wherein fluid conduits are positioned in said top wall above said sub-zones.

5. The apparatus as defined in claim 3 wherein said shaft is mounted to a lever member external of said vessel.

6. The apparatus as defined in claims 1, 2, 4 or 5 and further comprising a substantially flat fluid deflector plate disposed below and co-axially with said conduit member, said fluid deflector plate being mounted on a shaft; and means connected to said shaft to effect predetermined rotation of said fluid deflector plate about said shaft.

* * * * *